United States Patent [19]

Kühne

[11] Patent Number: 5,095,771

[45] Date of Patent: Mar. 17, 1992

[54] DOUBLE-MASS FLYWHEEL

[75] Inventor: Viktor Kühne, Bopfingen, Fed. Rep. of Germany

[73] Assignee: J. M. Voith GmbH, Fed. Rep. of Germany

[21] Appl. No.: 712,080

[22] Filed: Jun. 7, 1991

[30] Foreign Application Priority Data

Jun. 8, 1990 [DE] Fed. Rep. of Germany ....... 4018342

[51] Int. Cl.$^5$ .............................................. F16D 3/14
[52] U.S. Cl. ....................................... 74/572; 464/67
[58] Field of Search ..................... 74/572; 464/61, 62, 464/66, 67

[56] References Cited

U.S. PATENT DOCUMENTS 4,702,721 10/1987 Lamarche ............................ 464/67
4,813,295 3/1989 Drexl et al. ............................ 74/572

FOREIGN PATENT DOCUMENTS

0325724 8/1989 European Pat. Off. ............... 74/572
61-127940 6/1986 Japan ..................................... 74/572
2-190642 7/1990 Japan ..................................... 74/572
2191265 12/1987 United Kingdom ................... 74/572

Primary Examiner—Leslie A. Braun
Assistant Examiner—William O. Trousdell
Attorney, Agent, or Firm—Ostrolenk, Faber, Gerb & Soffen

[57] ABSTRACT

A double-mass flywheel for installation between an internal combustion engine and a transmission. A first flywheel mass associated with the crankshaft of the engine has the shape of a first U which opens radially inward and each of the arms of the U forms a side disk. A second flywheel mass associated with the transmission has the shape of a second U which opens radially outward toward the circumference. The second U engages as a center disk between the two side disks. The two masses are turnable to a limited extent with respect to each other, with the interposition of elastic members which rest at least indirectly on the one side against the first mass and on the other side against the center disk. Damping elements are interposed between the two masses and extend parallel to the elastic members. The center disk is formed of three concentric, partial disks, comprising an inner partial disks and two outer partial disks. These three partial disks have projections which form stop surfaces, with projections of the inner partial disk cooperating with projections of the two outer partial disks. Each end of an elastic member rests against one of the outer partial disks.

16 Claims, 6 Drawing Sheets

DOUBLE-MASS FLYWHEEL

BACKGROUND OF THE INVENTION

The present invention relates to a double-mass flywheel, sometimes called a divided flywheel, particularly for installation between an internal combustion engine and a transmission, preferably for use in a motor vehicle or another comparable installation.

A double-mass flywheel of this type is known from published Federal Republic of Germany Application OS 39 30715.8. It includes an elastic coupling which is arranged between a first flywheel mass and a second flywheel mass and which is connected in series with a slippable friction clutch. In that flywheel, a friction element of the friction clutch is acted upon by centrifugal force and is thus able to limit the torque transmitted below a specific speed of rotation. In this way, peak torques in the resonant region are reduced.

There is one disadvantage of this previously known double-mass flywheel. The springs for transmitting the torque from one flywheel mass to the other lie radially relatively far inward. Due to the resulting relatively small radius of action, the springs must be made correspondingly stronger. The stronger springs take up a correspondingly greater amount of space in the axial direction. However, the designer of the flywheel has little space available, especially in the axial direction.

Federal Republic of Germany published Application OS 38 15 505 describes a double-mass flywheel in which the springs are arranged in the region of the outer circumference, so that the springs have a greater radius of action and can be made of correspondingly smaller size. However, the springs extend around the circumference, over a lengthy portion of the circumference. Thus, no space remains for an articulated connection of the two side disks or for the inclusion of a torque limitation, which would have advantages with respect to the strength and the life of the double-mass flywheel.

SUMMARY OF THE INVENTION

The double-mass flywheel or divided flywheel of the invention transmits torque from the driving crankshaft of an engine to a transmission. But, it is useful in other applications as well.

The object of the invention is to develop a double-mass flywheel such that, on the one hand, the major part of its circumference is available for a spring or springs which act both in the push and the pull, opposite rotation directions and that, on the other hand, there is the possibility of interrupting this circumference without the angle of turning in the push and pull directions being considerably reduced. Furthermore, the cost of manufacture should be as small as possible and the construction of the double-mass flywheel should be as simple as possible. Finally, the entire space, primarily the axial length, taken up by the double-mass flywheel should be as small as possible.

The concept of the invention is to divide the central disk that joins the two flywheel masses into a radially inner partial disk connected to the driven flywheel mass and two radially outer partial disks of which one at any time is directly driven by the other driving flywheel mass to, in turn, drive the inner partial disk.

The inner partial disk is generally connected with and fixed for rotation with the driven flywheel mass. However, a rotation locked connection between them would also be possible, obtained for instance via springs. The two outer partial disks are associated with the driving flywheel mass. Depending on the direction of rotation pull or push operation, respectively, one of the outer partial disks is driven to rotate by the first mass. The other second outer partial disk is driven by the first one through elastic means between them.

This arrangement operates, for instance, as follows. During pull operation, the inner partial disk is driven to rotate by the first outer partial disk and the latter is driven to rotate by the side disks, which form part of the first flywheel mass. In a similar manner, during push operation the inner partial disk is driven to rotate by the second outer partial disk turn and the second outer partial disk is driven to rotate by the side disks. In each case, the other outer partial disk helps to maintain the contact between the inner partial disk and the then driven outer partial disk.

The partial disks can be developed such that they together form mechanical stops such that when abuttable surfaces on the partial disks abut, as detailed below, further relative rotation between those partial disks is prevented. The partial disks, and particularly projections thereon, can furthermore enclose ends of damping displacement chambers, if the double-mass flywheel is provided with such chambers.

Other features and advantages of the present invention will become apparent from the following description of the invention which refers to the accompanying drawings.

BRIEF DESCRIPTION OF THE DRAWINGS

FIGS. 2 to 4 show different conditions of rotation, with FIG. 2 showing the "neutral" state, i.e. without rotation, while FIGS. 3 and 34 show the maximum conditions of rotation in one and the other direction.

DETAILED DESCRIPTION OF THE PREFERRED EMBODIMENT

Figure 1:
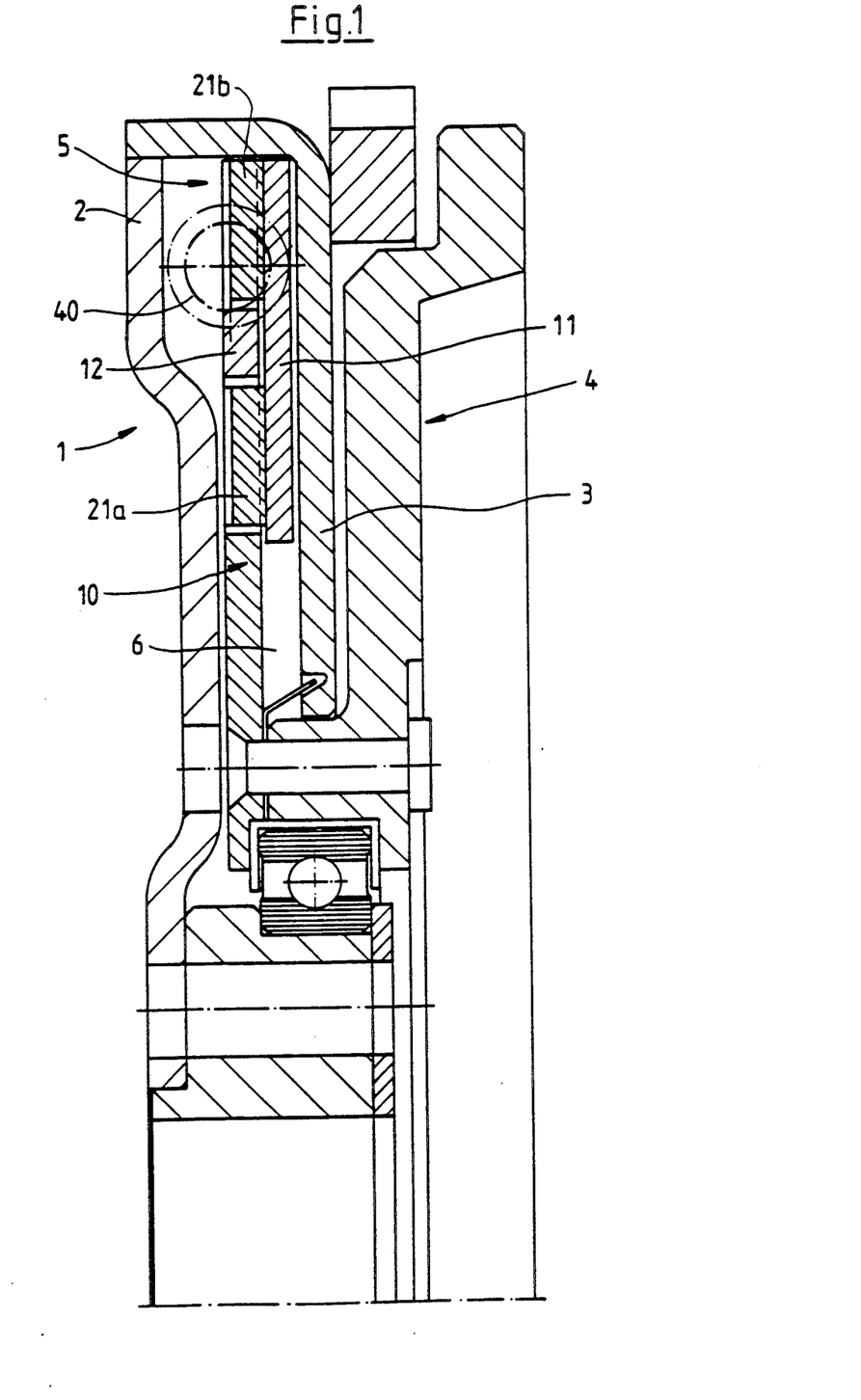
FIG. 1 is a cross-section, along the rotation axis and along a radius, of the double-mass flywheel of the invention.
Figure 6:
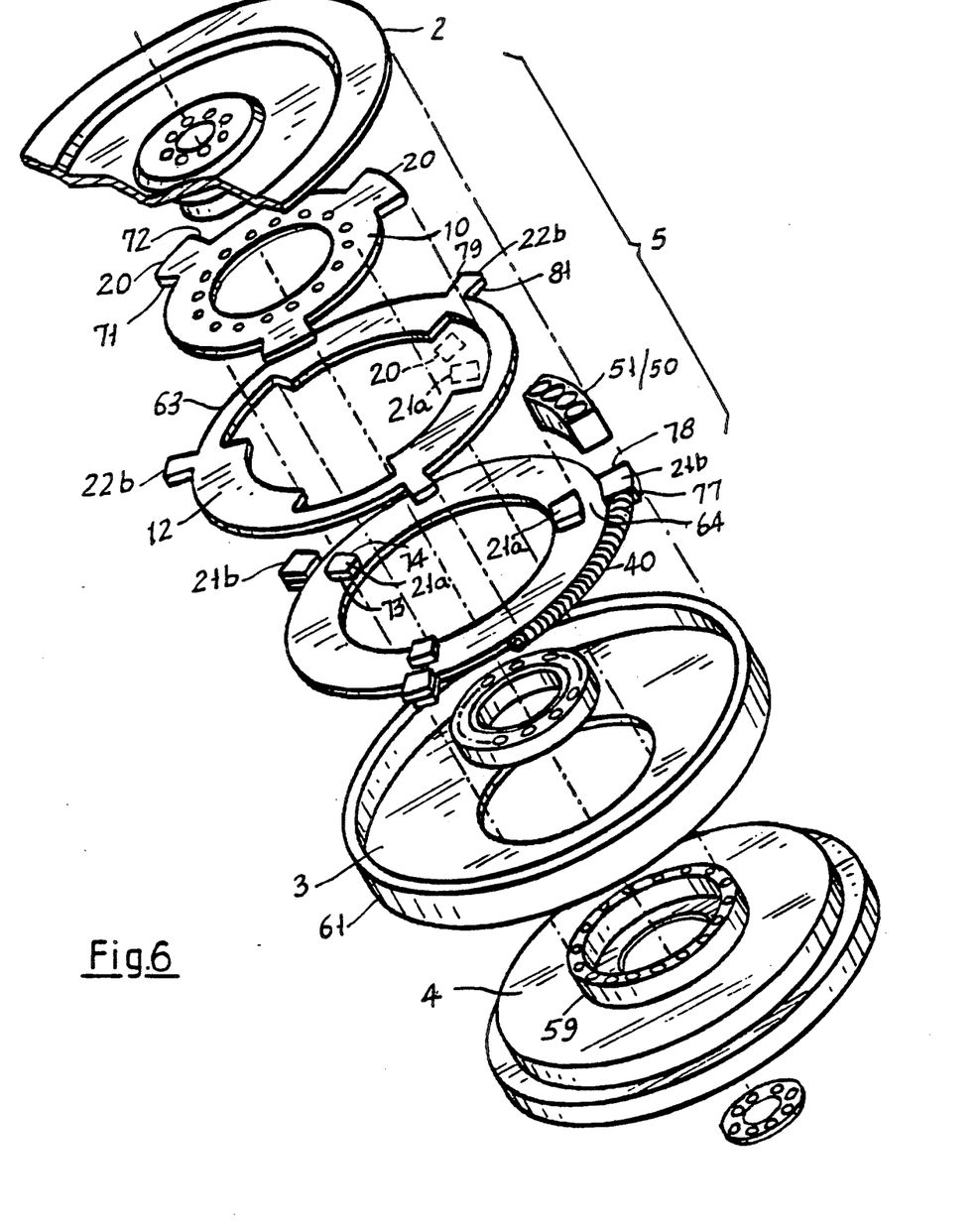
FIG. 6 is an exploded perspective view of the principal elements of the double-mass flywheel.

Referring to FIGS. 1 and 6, the double-mass flywheel has a first flywheel mass 1 which is drivable to rotate on its central rotary axis by the crankshaft of an engine, not shown here. The flywheel mass 1 has the shape, in the half-circle longitudinal section of FIG. 1, of a U which opens radially inward. The two arms of the U form two side disks 2 and 3 which are fastened together by the peripheral flange 61 of the disk 3 engaging the periphery of the disk 2.

Referring to FIGS. 1 and 6, the double-mass flywheel has a second flywheel mass 4, which is drivable to rotate on the same central rotary axis and is connected to drive a vehicle transmission, not shown here. The flywheel mass 4 also has the shape in the half-circle longitudinal section of FIG. 1, of a U, which opens radially outward toward the circumference. One arm 5 of the second flywheel mass 4 is in the form of below described inner partial disk 10. That partial disk 10 cooperates with other outer partial disks 11 and 12, also described below, which are driven by the disks 2 and 3. The combined partial disks 10, 11 and 12 extend radially outward into the inner space that is formed between the two side disks 2 and 3 and define a center disk 5.

The two flywheel masses 1 and 4 may be turned to a limited extent with respect to each other. For this purpose, there are springs 40 interposed between the masses 1 and 4. These springs 40 transmit torque from the first flywheel mass 1 to the second flywheel mass 4 via the center disk 5.

A damping device is connected between the two flywheel masses 1 and 4. The damping device absorbs vibrations and smooths the force transmission between the flywheel masses. In the present case, the damping device comprises displacement chambers 30 of variable volume, discussed further below.

In accordance with the invention, the center disk 5 is formed of three individual partial disks which are concentric. They comprise a radially inner partial disk 10 and two axially neighboring, radially outer partial disks 11, 12. The shapes of these partial disks are shown in FIGS. 2 to 4 and 6. The inner disk is disposed radially inside of and is axially at the location of the outer disk 12, as discussed below. The outer disk 12 is axially next to the outer disk 11. Each partial disk 10, 11, 12 of the center disk 5 has respective circumferentially spaced apart projections, described below.

Figure 2:
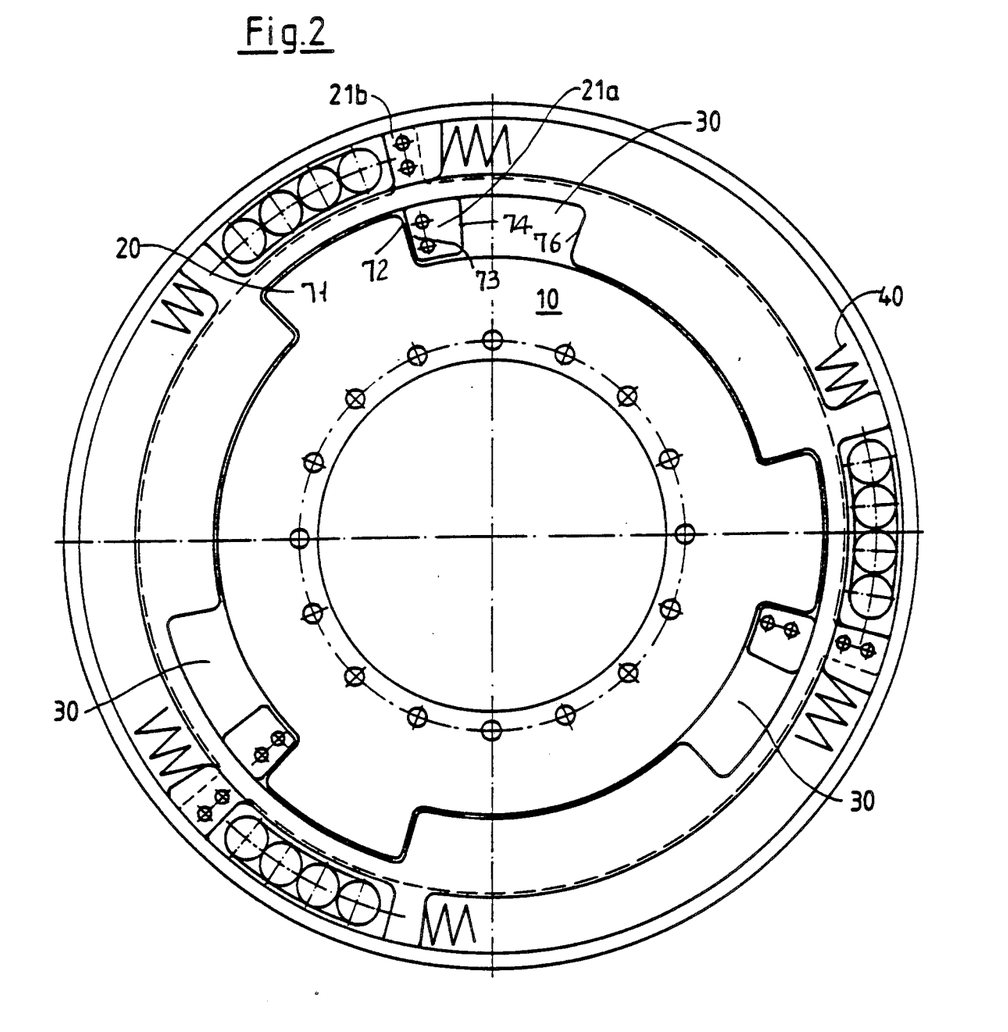
FIGS. 2 to 4 show top views of the double-mass flywheel of FIG. 1 as seen from the engine side (from the left in FIG. 1), the engine-side side disk of the first flywheel mass having been removed.

The radially inner partial disk 10 is secured to the central hub part 59 of the flywheel mass 4, as suggested by the cooperating securement holes in those elements shown in FIGS. 2 and 6, making elements 4, 5, 9 and 10 one generally U-shaped element, as seen in the longitudinal half-circle section of FIG. 1.

The inner partial disk 10 has three radially outward projections 20, which are formed directly on the inner partial disk 10. Each projection 20 has circumferentially opposite, radially outwardly directed first and second sides 71 and 72, which cooperate with one side e.g. 75 of the respective arcuate notch 62 in the interior of the outer partial disk 12 and with one side e.g. 73 of the respective axial projection 21a of the outer partial disk 11, as described below.

The first outer partial disk 11 is loosely installed in the enclosure defined by the side disks 2 and 3 and is not directly secured to another element. The first outer partial disk has radially inner projections 21a. Each projection 21a projects axially into one of the notches 62 in the partial disk 12. The projection 21a has circumferentially opposite, radially outwardly directed third and fourth sides 73 and 74. The side 73 is abuttable against the respective opposed side 72 of the projection 20 in the same notch 62. The side 74 is abuttable against the notch wall 76.

The first outer partial disk 11 also has radially outward projections 21b. One circumferential side 77 of each projection 21b cooperates with a respective spring 40 for force transmission between the outer partial disks 11 and 12. The other opposite circumferential side 78 of the projection 21b cooperates with one of the ends of the adjacent slip transmission member 50, described below. The projections 21a and 21b are axially aligned with the inner partial disk 10. The body of the disk 11 can be thin axially, just thick enough to stiffly support the projections 21a and 21b. With the partial disks 11 and 12 next to each other the center disk can be quite thin axially.

The second outer partial disk 12 also is loosely installed in the enclosure defined by the side disks 2 and 3 and is not directly secured to another element. The second outer partial disk has relatively arcuately wide, radially inner projections 22a, which between them define the notches 62. Each notch 62 has circumferentially opposed, radially inwardly directed, fifth and sixth sides 75 and 76, which are also formed on the opposite radial sides of the projections 22a.

The disk 12 has radially outer projections 22b. Each projection includes one radial side 79 that cooperates with the opposed radial side 78 of the respective neighboring projection 21b to support the opposite ends of a respective spring 40. The other opposite side 81 of the projection 21b cooperates with the adjacent end of the respective slip transmission member 50, described below.

As can be noted from FIGS. 1 and 6, the active projections 20, 21, 22 of the individual partial disks 10, 11, 12 that make up the central disk 5 are arranged one behind the other in the radial direction, i.e. without axial offset of the projections. In this connection, the side disks 2 and 3 provide axial guidance for the individual components of the center disk. The side disk 3, and particularly its peripheral flange 61 provides radial guidance for the outer partial disks 11 and 12 because the peripheries of the projections 21b and 22b are guided on the flange interior. As can be noted from FIGS. 1 and 6, the outer partial disk 12, and particularly its radially narrow arcuate regions 63 outside the notches 62, are located radially between structural parts of the outer partial disk 11, and particularly between the axially projecting, radially separated projections 21a and 21b. Between each of these two projections 21, the outer partial disk 11 has a connecting web 64 which is located axially along the two projections. This connecting web is important for taking up the torque from the projections and for conducting the torque further, namely in the circumferential direction and namely radially inward to radially outward. The axial size, i.e. the thickness of the web 64, can be as small as necessary for carrying out this function thereby making the entire flywheel axially thin.

As can be noted in FIGS. 2 to 4 and 6, all of the projections have stop surfaces 71–81 which extend generally radially. Every two opposed stop surfaces cooperate with each other, in that the radially outwardly extending stop surfaces of the projections 20 in the inner partial disk 10 cooperate with the radially inwardly extending stop surfaces of the projections 21a and 22a of both outer partial disks 11, 12.

Figure 3:
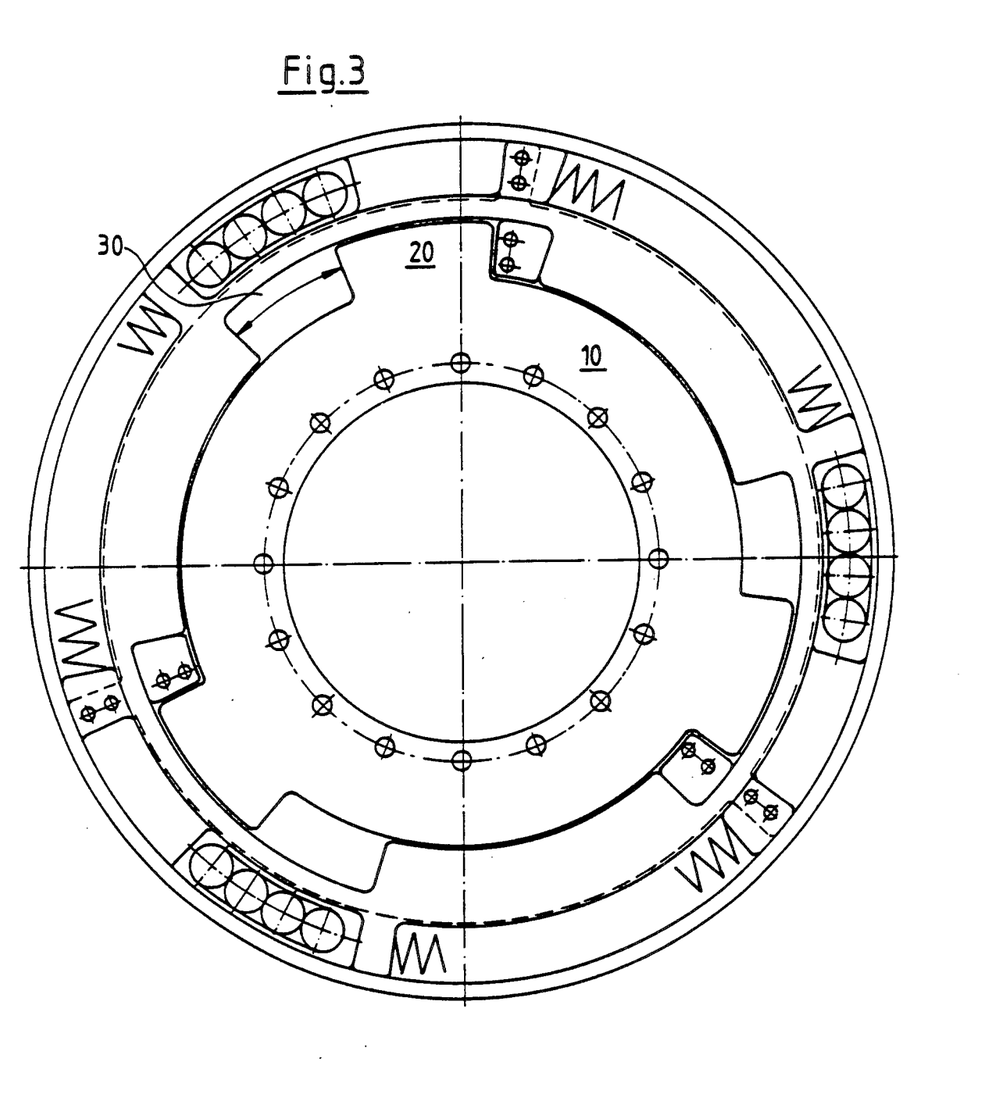
Figure 4:
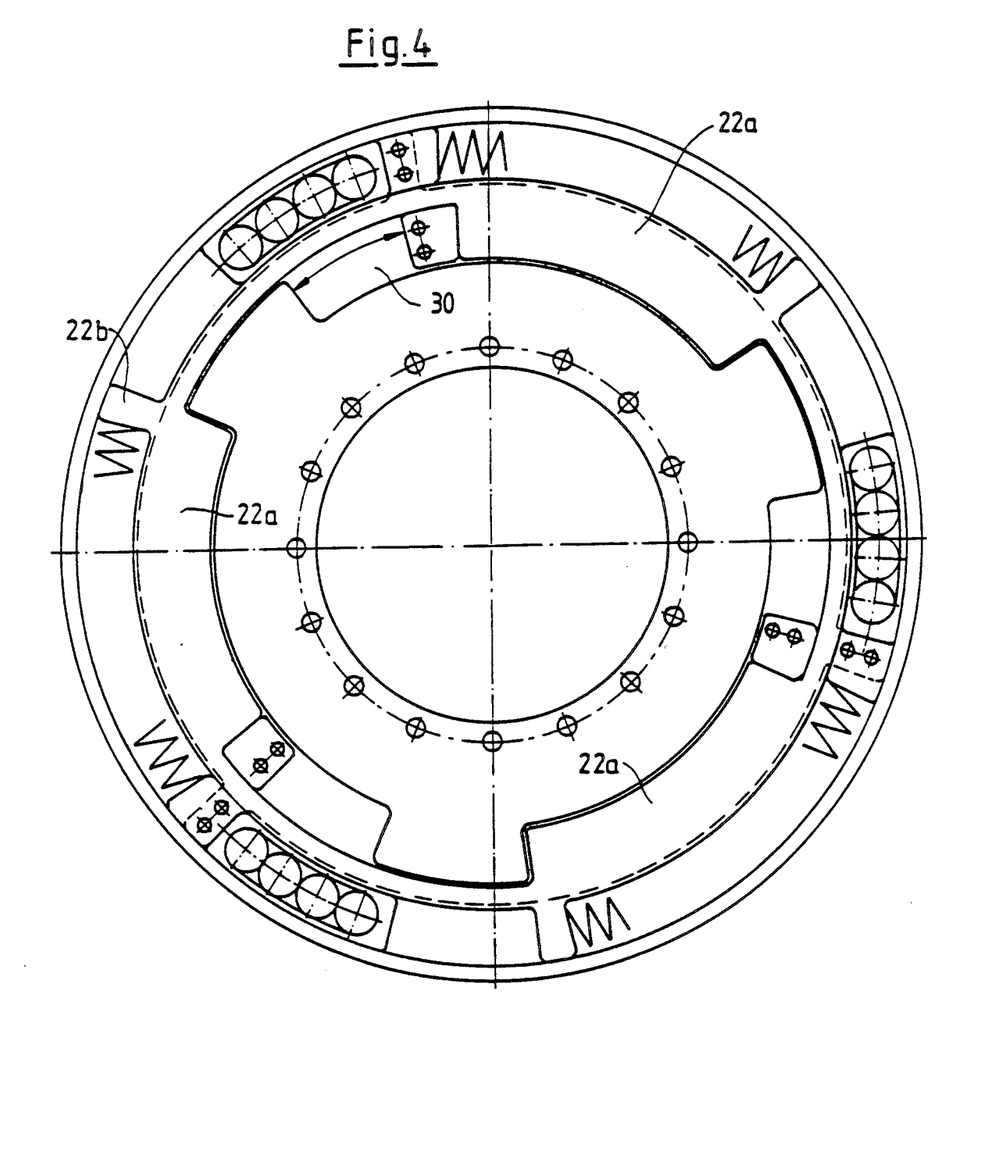

The displacement, damping chambers 30 are formed in and comprise arcuate parts of the larger notches 62 in the outer partial disk 12. Their arcuate positions and the elements defining their circumferential ends vary under the different operating conditions shown in FIGS. 2 and 4. The chambers 30 can each be limited by an arcuate part of the radially outer wall surface of the inner partial disk 10, by an arcuate part of the radially inner wall surface of the first outer partial disk 11, and by radial end sides of the projections 21a and 22a, as shown in FIGS. 2–4. There are narrow radial height, arcuate clearances between each of the projections 20, 21a and 22a and the partial disk wall toward which it projects. These define narrow cross-section hydraulic, or the like, fluid flow control and escape passages for whatever damping fluid is used in the displacement chambers 30. Those chambers and the throttled fluid escaping therefrom damps motion of the disks and makes it smoother.

Springs 40 are placed at the outer circumference of the flywheel. The springs develop particularly high effectiveness, and can therefore be weaker springs or thinner diameter springs than have been heretofore used, so that the springs can take up little axial or radial space. Furthermore, the angle of rotation of outer partial disks 11 and 12 can be as large as possible. Each spring 40 rests against opposed and arcuately separated end sides 77 and 79 of two neighboring outward projections 21b and 22b of the two outer partial disks 11 and 12. As a result, rotation of one of projection 21b or 22b, via rotation of its respective partial disk 11 or 12, moves the other projection and its partial disk through the spring 40 between the projections.

Figure 5:
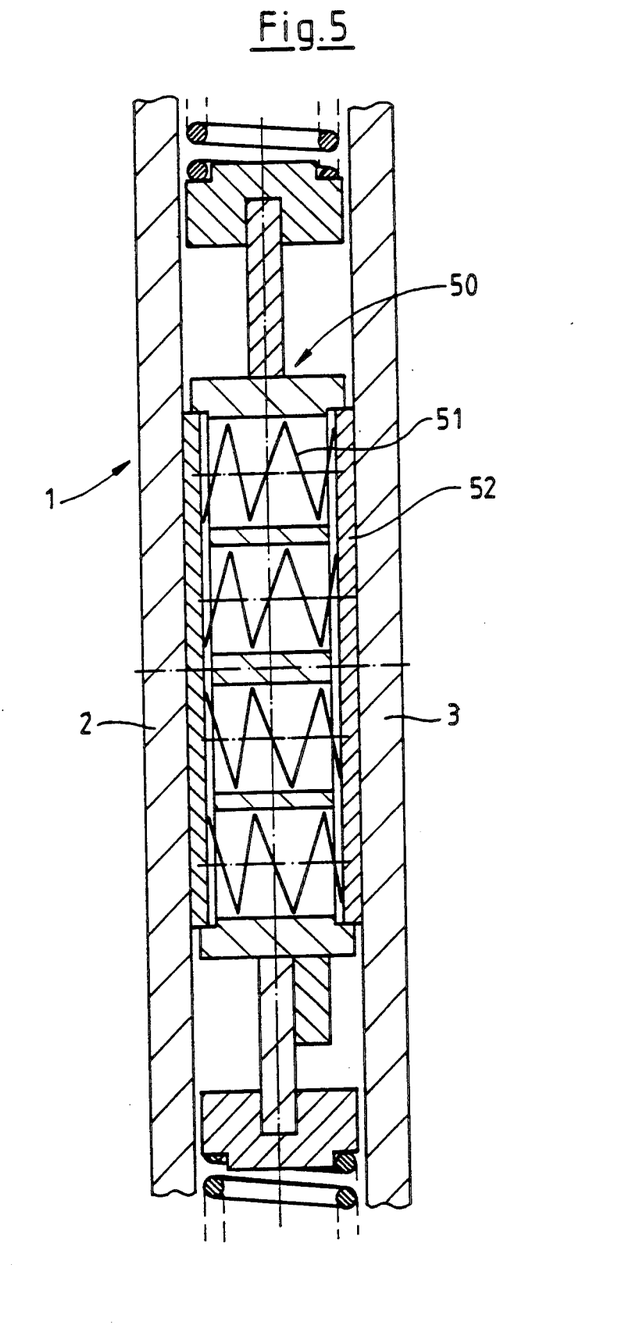
FIG. 5 shows the double-mass flywheel in a cylindrical section passing through the outer region of FIG. 1.

There is a force transmission from the first mass 1 to the central disk 5. From the two side disks 2, 3 of the first flywheel mass 1, the torque force is conducted via a special transmission member 50 to the respective one of the projections 21b and 22b between which the transmission member 50 is circumferentially positioned, which are the adjacent projections 21b and 22b which enclose the transmission member 50 between them (see FIG. 5). Depending upon the direction of rotation of the flywheel mass 1, the transmission member eventually contacts one or the other of the opposed sides 78 and 81 of the respective projections 21b and 22b. The transmission member 50 has springs 51 which act in the axial direction and which, via friction elements 52 axially outside the springs, press against the two side disks 2 and 3 and permit rotary slippage between the transmission member and the side disks. When the disks 2 and 3 start rotating, or if the torque is excessive, or when the transmission member 50 hits a projection 21b or 22b, there can be slippage. The transmission member provides impact protection and is a protection in the event the flywheel mass 4 is blocked against motion or there is excessive torque applied.

The flow of force takes place as follows: Force is introduced from the engine (not shown), from the left side of the double-mass flywheel in FIGS. 1 and 6 into the first flywheel mass 1. The disks 2 and 3 making up the mass 1 frictionally transmit the force to the transmission member 50. Depending upon the direction of rotation of the disks 2, 3, the transmission member 50 abuts a projection 21b or 22b and that rotates the respective outer partial disk 11 or 12 along with the rotating disks 2, 3. Through the springs 40, that rotation of one partial disk in turn rotates the other outer partial disk 11 or 12. The projections 20 of the inner disk 10 are arcuately narrower than and are inside the respective notches 62. (Those notches also define the damping chambers 30.)

One side of the projection 20, e.g. 71, may be engaged by a radial side, e.g. 75, of the notch 62. The other side, e.g. 72, of the projection 20 may be engaged by the side, e.g. 73, of the respective adjacent inward projection 21a. In this way, torque force of outer partial disks 11 and 12 is transferred to the inner partial disk 10. The two outer partial disks are provided to assure extra and full length of motion of the inner partial disk 10. Also, one or the other of the two inner projections 21a and 22a and their abutting surfaces press on opposite sides of the respective outer projection as seen in either of FIGS. 3 and 4, for transmitting force between the outer and inner partial disks. Disk 10 is fastened at hub 59 to mass 4, so that rotation of disk 10 rotates mass 4 and drives the transmission connected to mass 4. The same type of action occurs with rotation of mass 1 in either direction, since the transmission member 50 abuts either of the projections 21b or 22b.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A double-mass flywheel for installation between an internal combustion engine and a transmission, or for the like installations, the flywheel comprising:

(a) a rotary first mass for being associated with the drive shaft of an engine; in longitudinal section radially out from the center of rotation, the first mass having the general shape of a first U which is open radially inward of the first mass, and the first U having arms which together form spaced apart side disks;

(b) a second rotary mass for being associated with a driven transmission; in longitudinal section radially out from the center of rotation, the second mass having the general shape of a second U which is open radially outward toward the circumference of the second mass, and the second U having one arm serving as a center disk between the two side disks of the first U;

(c) the first and second masses being on an axis for being turnable to a limited extent with respect to each other;

(d) a center disk including the arm of the second U and comprising three concentric, partial disks, including a radially inner partial disk connected to rotate with the second mass and two radially outer partial disks which are radially more outward than the inner disk and are driven to rotate by the side disks;

(e) the three partial disks having projections thereon, the projections of the inner partial disk projecting radially to cooperate with the projections of the two outer partial disks so that the inner disk is driven to rotate by engagement of the projections of one of the outer partial disks, dependent upon the direction of rotation of the outer partial disks; and (f) elastic members each having opposite ends which rest against a respective one of the outer partial disks for one outer partial disk to drive the other partial disk to rotate in the same direction through the elastic members.

2. The double-mass flywheel of claim 1, further comprising damping means between the two masses and operating parallel to the elastic members.

3. The double-mass flywheel of claim 1, wherein the damping means comprises displacement chambers of variable volume, and each displacement chamber is limited by a part of the outer surface of the inner partial disk, by a part of the inner surface of one of the two outer partial disks, and by circumferential, radially extending sides of the respective projections of the partial disks which are at the displacement chamber.

4. The double-mass flywheel of claim 1, wherein the two outer partial disks have radially outward projections, and the elastic members have opposite ends with one elastic member end resting against the outward projection of one of the outer partial disks and with the other elastic member end resting against the outward projection of the other outer partial disk.

5. The double-mass flywheel of claim 3, wherein for transmission of torque between the first flywheel mass and the center disk there is a transmission member having lateral sides between the two side disks of the first flywheel mass and having circumferential end sides between two neighboring projections, one projection from each of the two outer partial disks, one of the end sides of the transmission member contacting the circumferential side of one of the projections that faces away from the respective elastic members engaging those projections.

6. The double-mass flywheel of claim 5, further comprising springs for clamping the transmission member under spring action between the two side disks of the first flywheel mass and the springs enabling slipping of the transmission member in the circumferential direction with respect to the side disks.

7. A double-mass flywheel for installation between a drive means and a driven means, the flywheel comprising:
(a) a rotary first mass for being associated with the drive means; in a longitudinal section radially out from the center of rotation, the first mass including a side disk attached to it;
(b) a rotary second mass for being associated with the driven means; in a longitudinal section radially out from the center of rotation, the second mass having the general shape of a U which opens radially outward toward the circumference of the second mass, and the U having one arm serving as part of a center disk next to the side disk;
(c) the first and second masses being on an axis for being turnable to a limited extent with respect to each other;
(d) a center disk including the arm of the U and comprising three concentric, partial disks, which include a radially inner partial disk and two radially outer partial disks, which are radially more outward than the inner disk;
(e) an elastic member having first and second ends each resting against a respective one of the outer partial disks, for causing one outer partial disk to drive the other outer partial disk to rotate in the same direction through the elastic member;
(f) the inner partial disk having a first radial surface which faces in one circumferential direction, the first of the outer partial disks having a cooperating second radial surface that opposes the first radial surface of the first disk, such that rotation of the first outer disk with respect to the inner disk brings the first and second radial surfaces into abutment and rotates the inner partial disk;
(g) the inner partial disk being part of the second mass such that rotation of the inner partial disk rotates the second mass.

8. The double-mass flywheel of claim 7, wherein the inner partial disk has a third radial surface facing in the opposite direction from the first radial surface thereof and the second outer partial disk has a fourth surface facing opposed to the third surface, such that with the first and second surfaces in abutment, the third and fourth surfaces are also in abutment, with the first outer partial disk being driven in one direction of rotation by the side disks and the second outer partial disk being driven by the elastic member.

9. The double-mass flywheel of claim 8, wherein the inner partial disk has a radially outward projection on which the opposite first and third surfaces are defined, the first outer disk has a notch in it with an end sidewall on which the second surface is defined and the radially outward projection is in the notch; and the second outer partial disk has a projection on it on which the fourth surface is defined.

10. The double-mass flywheel of claim 9, wherein the second outer partial disk projection, on which the fourth surface is defined, is an axial projection from the second partial disk; the first and second outer partial disks being placed axially next to each other and the axial projection of the second outer disk extending into the notch of the first outer disk at the opposite side of the outward projection of the inner partial disk from the first and second surfaces.

11. The double-mass flywheel of claim 10, wherein for transmission of torque between the first flywheel mass and the center disk, there is a transmission member having lateral sides between the two side disks of the first flywheel mass and having circumferential end sides between two neighboring projections, which include one projection from each of the two outer partial disks; one of the end sides of the transmission member contacting the side of one of the projections that faces away from the respective elastic member engaging that projection.

12. The double-mass flywheel of claim 10, wherein the notch is of an arcuate size greater than the total arcuate size of the radially outward projection of the inner partial disk and of the axial projection in the notch, for defining a first damping chamber; a second damping chamber and means communicating a throttled flow between the first and second damping chambers.

13. The double-mass flywheel of claim 9, wherein each outer partial disk has a radially outward projection therefrom and the elastic member extends between the outer projections of the outer partial disks.

14. The double-mass flywheel of claim 13, wherein for transmission of torque between the first flywheel mass and the center disk, there is a transmission member having lateral sides between the two side disks of the first flywheel mass and having circumferential end sides between two neighboring projections, which include one projection from each of the two outer partial disks; one of the end sides of the transmission member contacting the side of one of the projections that faces away from the respective elastic member engaging that projection; the transmission member being movable by the side disk to engage one radially outer projection of one of outer partial disks such that rotation of the side disks rotates the transmission member for in turn rotating the respective outer partial disk engaged by the transmission member.

15. The double-mass flywheel of claim 7, wherein the outer partial disks have radially outward projections therefrom and the elastic member extends between the outer projections of the outer partial disks.

16. The double-mass flywheel of claim 7, wherein the first mass has the general shape of a second U which opens radially inward of the first mass, and the second U having arms which together form two spaced apart side disks between the two side disks of the first U; the first mentioned U of the second mass has the part of the center disk between the two side disks of the first mass.

* * * * *